Patented July 15, 1941

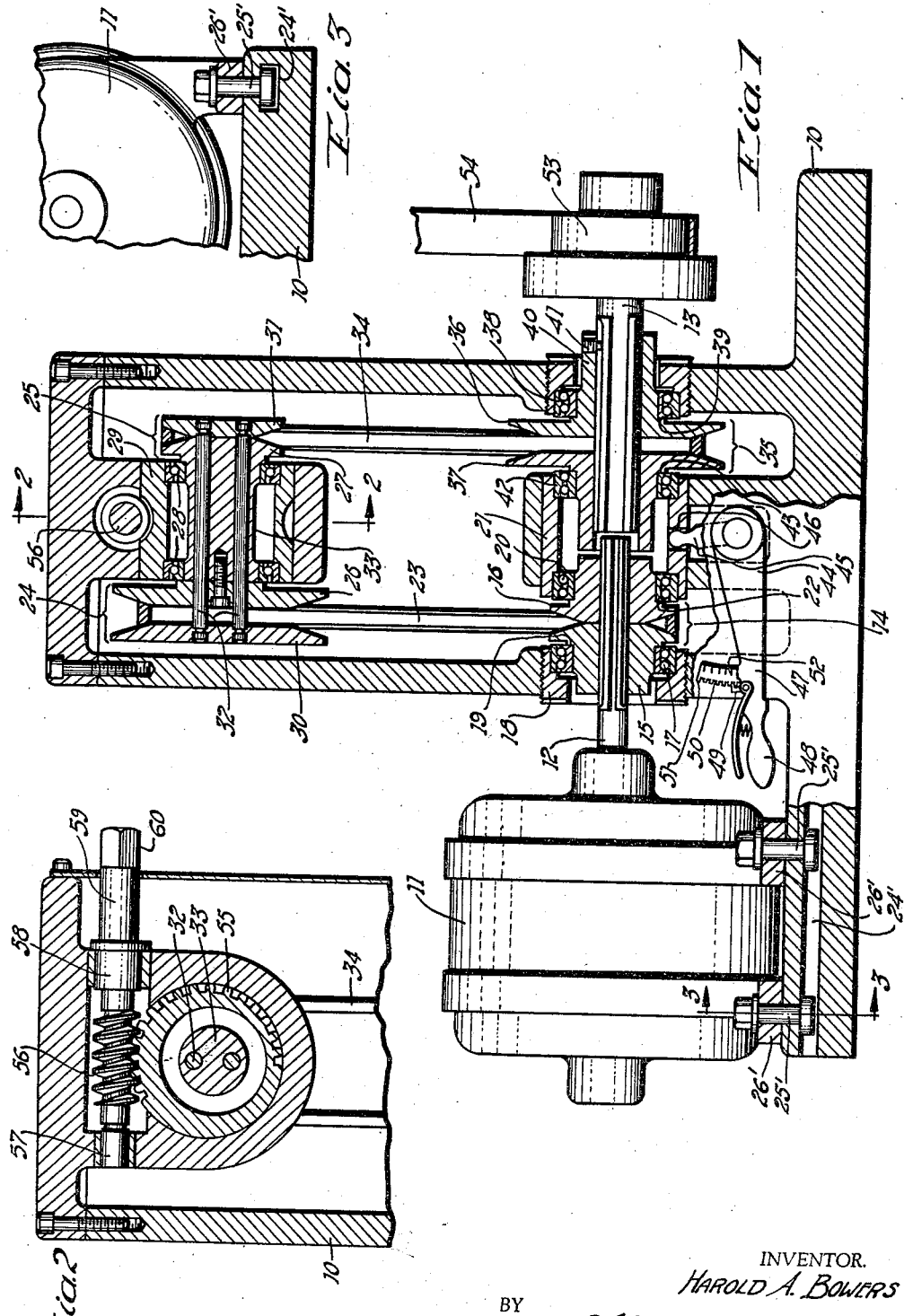

2,248,948

UNITED STATES PATENT OFFICE 2,248,948

VARIABLE SPEED TRANSMISSION

Harold A. Bowers, Mariemont, Ohio, assignor to Cincinnati Grinders Incorporated, Cincinnati, Ohio, a corporation of Ohio Application March 6, 1940, Serial No. 322,499

5 Claims. (Cl. 74—230.17)

This invention relates to transmission units of the self-contained variable speed type.

One of the objects of this invention is to provide an improved variable speed transmission unit of the expanding cone pulley type.

Another object of this invention is to provide an expanding cone pulley variable speed transmission unit which is self-adjusting, thereby assuring equal belt tension for all speeds.

A further object of this invention is to provide an expanding pulley type variable speed transmission unit wherein only one set of pulleys is positively positioned to vary the speed, the remaining pulleys being free floating for automatic adjustment of belt tension.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is an elevational view partly in section of one embodiment of the invention.

Figure 2 is a section on the line 2—2 of Figure 1.

Figure 3 is a section on the line 3—3 of Figure 1.

In Figure 1 of the drawing there is shown a typical embodiment of the invention which will be utilized to explain the principles of operation thereof. In this figure the reference numeral 10 indicates the base or main support of the unit, upon which is mounted an electric motor 11 which typifies a source of power for actuation of the power input or driving shaft 12 of the transmission unit.

An output or driven shaft 13 is supported in axial alignment with the driving shaft 12. A driving pulley indicated generally by the reference numeral 14 is splined on the shaft 12 for rotation thereby. This pulley is of the expansible cone type comprising an axially fixed cone 15 and an axially adjustable cone 16. The fixed cone 15 is peripherally supported by anti-friction thrust bearings 17 in a sleeve 18 fixed to the base 10, shoulders 19 being provided on the cone for transmitting thrust to the bearing 17, as well as fixing the axial position of the cone.

The adjustable cone 16 is supported by an anti-friction thrust bearing 20 in the end of a sleeve 21. This cone has a shoulder 22 by which axial thrust on the cone is transmitted to the bearing. A V-belt 23 passes around the cones and the tension of the V-belt riding in the V-shaped space between the opposing faces of the cones serves to create axial force components which hold the shoulders 19 and 22 against the thrust bearings. Thus, the amount of separation between the cone pulleys and thereby the radius of the effective pitch diameter of the pulley is positively determined.

The sleeve 18 is provided to facilitate assembly of the parts while the shaft 12 is journaled and supported by the motor which is adjustably attached to the base to facilitate removal of the shaft 12 from the pulley assembly when belt changes are necessary. To this end the base 10 is provided with T-slots 24' in which are assembled clamping bolts 25' which pass through holes in the feet 26' of the motor 11 for the purpose of clamping the motor to the base as well as permitting adjustment thereof. The belt 23 drives expansible pulley, indicated generally by the reference numeral 24, and this pulley is connected for simultaneous rotation of expansible pulley 25. The pulleys 24 and 25 constitute an idler pulley couplet. The pulley 24 has a cone 26 which is integrally connected with the adjacent cone 27 of pulley 25. These two cones rotate as a unit and are supported by anti-friction bearings 28 in a sleeve 29. The remote cones 30 and 31 of pulleys 26 and 25 are connected for simultaneous axial movement by rods 32 which pass through the supporting hub 33 of the fixed cones 26 and 27.

A V-belt 34 passes around the pulley 25 connecting it to the final driven pulley 35. It will now be noted that the tension of the belt 34 acting in the V-groove of pulley 25 tends to shift the movable cone 31 to the right as viewed in Figure 1, and the tension of belt 23 acting in the V-groove of pulley 24 tends to shift the cone 30 to the left. Thus, there is created opposing forces acting on the cones 31 and 30, tending to shift them in opposite directions which means that they will automatically take up a position in which these forces are balanced and in so doing will automatically inversely adjust the pitch diameters of the idler pulleys.

The pulley 35 is made up of cones 36 and 37, the cone 36 being referred to as the fixed cone and the cone 37 as the movable cone. The cone 36 is supported in anti-friction thrust bearings 38 and is provided with a shoulder 39 which abuts the thrust bearing and is thereby positively positioned thereby. The cone 35 has an elongated hub 40 in which is mounted a set screw 41 for clamping the output shaft 13 against axial movement.

The cone 37 is supported in anti-friction thrust bearings 42 which are mounted in the sleeve 21 and the pulley is provided with a shoulder 43 which abuts the thrust bearing and is held against it by the tension of the belt 34.

Speed changes are effected by axially adjusting the sleeve 21, and, for a given direction of movement, this will cause contraction of one set of cones and expansion of the other set of cones of the pulleys 14 and 35. This will produce an increase in tension in one of the V-belts 23, 34 which tension will unbalance the opposing forces acting on the cones 30 and 31 of the idler pulleys, producing a shifting thereof which will reduce the tension in one belt and increase the tension by taking up the slack in the other belt. This adjustment is effected by a bell crank lever 44 which has one arm 45 engaging an opening 46 in the sleeve 21. The other arm 47 is provided with a handle 48 for manual actuation, and a spring pressed pawl 49, which engages notches 50 in a fixed plate 51 for positively holding the bell crank in any given position. The plate 51 may be provided with graduations 52 to indicate the speed setting of the device.

The output shaft 13 may be directly connected to the device to be operated or may be provided with a three-stepped cone pulley 53 whereby the shaft may be connected to the driven device in an additional series of speed ratios by a belt 54. The output shaft 13 is a spline shaft which engages splines on both pulleys 36 and 37, and by loosening the set screw 41 the shaft may be withdrawn whenever belt replacement is necessary.

To facilitate the application of new belts and to provide adjustment for belt tension for worn belts, the sleeve 29 which supports the idler pulley assembly is provided with an eccentric periphery in which gear teeth 55 are cut. A spiral worm gear 56 is supported in engagement with these teeth for effecting rotation of the sleeve 29 to thereby vary the distance between the center of the idler pulley assembly and the center of rotation of the driver and driven pulleys 14 and 35. This worm gear is provided with bearings 57 and 58 by which it is journaled in the machine frame, and has an elongated shaft 59 which is provided with a square end 60 to which a suitable wrench may be applied for adjustment purposes.

In adjusting the device the operator moves the control lever 48 downward or counterclockwise to increase the speed of the device and upward or clockwise to decrease the speed of the device. When the lever is moved downward the cone 16 is moved toward the cone 15, thereby creating a tension in the belt 23 causing it to ride further out toward the periphery of the driving pulley, thus increasing the pitch diameter thereof. At the same time the tension in the belt 23 causes separation of the cone 30 from the cone 26, decreasing the effective pitch diameter of pulley 24.

This results in an opposite shift of the cone 31 with respect to the cone 27 which would create a tension in the belt 34, but the cone 37 of pulley 35 was permitted to shift to the left when the sleeve 21 was adjusted which tended to produce a slack in the belt 34. Therefore, when the cone 31 shifted toward the left there was really no tension on the belt 34 and this shifting movement was unopposed until the cone 31 reached a position to put a tension in belt 34 which equalled the tension in belt 23. It will be noted that the shifting of cone 31 increased the effective pitch diameter of pulley 25 and that the separation of cone 37 from cone 36 reduced the effective pitch diameter of pulley 35, thereby increasing the speed ratio between these two pulleys.

When the lever 48 is adjusted clockwise the reverse of these various adjustments is effected, the cone 37 moving toward the cone 36 to increase the tension in belt 34 and the cone 16 moving away from the cone 15 to decrease the tension in belt 23 whereby the cones 31 and 31 shift toward the right to reestablish equal belt tensions and inversely change their respective pitch diameters, thereby producing a lower speed ratio.

It will thus be apparent that a speed change is made by producing a differential in the belt tensions which causes an automatic shift of the cones in the idler pulley assembly to re-equalize the belt tensions and in so doing effect a change in their effective pitch diameters which produces an overall change in the speed ratio between the driving and driven pulley.

What is claimed is:

1. A mechanism of the character described comprising in combination a pair of expansible V-pulleys one of which is the driver and the other the driven, a sleeve rotatably supporting the adjacent members of the pulleys, fixed bearings for supporting the remote members of the pulleys, separate spline shafts engaging the members of the respective pulleys, power means for rotating the drive pulley shaft, a final actuator attached to the driven pulley shaft, means to adjust said sleeve axially to expand one pulley and to contract the other whereby the pitch diameters thereof will be inversely changed, V-belts connecting said pulleys to a pair of expansible idler V-pulleys, said idler pulleys having integral adjacent members rotatable in fixed planes, and means connecting the remote members of the idler pulleys for rotation with the adjacent members but for axial movement relative thereto whereby the pitch diameters of the idler pulleys will be inversely changed automatically by belt tension differentials in accordance with adjustment of the driver and driven pulleys.

2. A mechanism of the character described comprising in combination a pair of expansible V-pulleys one of which is the driver and the other the driven, a sleeve rotatably supporting the adjacent members of the pulleys, fixed bearings for supporting the remote members of the pulleys, separate spline shafts engaging the members of the respective pulleys, power means for rotating the drive pulley shaft, a final actuator attached to the driven pulley shaft, means to adjust said sleeve axially to expand one pulley and to contract the other whereby the pitch diameters thereof will be inversely changed, V-belts connecting said pulleys to a pair of expansible idler V-pulleys, said idler pulleys having integral adjacent members rotatable in fixed planes, means connecting the remote members of the idler pulleys for rotation with the adjacent members but for axial movement relative thereto whereby the pitch diameters of the idler pulleys will be inversely changed automatically by belt tension differentials in accordance with adjustment of the driver and driven pulleys, and means to adjust the tension in both of said belts simultaneously including an eccentric sleeve for supporting the idler pulleys and means to rotate said sleeve.

3. A mechanism of the character described comprising in combination a pair of expansible V-pulleys, a sleeve rotatably supporting the adjacent members of said pulleys, fixed bearings for supporting the remote members of the pulleys, a power driven spline shaft engaging the members of one pulley, a second spline shaft engaging the members of the other pulley for actuation thereby, means to adjust said sleeve axially to expand one pulley and contract the other comprising a manually actuable bell crank lever, means for positively locking the lever in different rate positions, V-belts connecting said pulleys to a pair of expansible idler V-pulleys, said idler pulleys having integral adjacent members rotatable in fixed planes, means connecting the remote members of the idler pulleys for rotation with the adjacent members but for axial movement relative thereto whereby the pitch diameters of the idler pulleys will be inversely changed automatically by belt tension differentials in accordance with adjustment of said bell crank lever.

4. A mechanism of the character described comprising in combination a pair of expansible V-pulleys, a sleeve rotatably supporting the adjacent members of said pulleys, fixed bearings for supporting the remote members of the pulleys, a power driven spline shaft engaging the members of one pulley, a second spline shaft engaging the members of the other pulley for actuation thereby, means to adjust said sleeve axially to expand one pulley and contract the other comprising a manually actuable bell crank lever, means for positively locking the lever in different rate positions, graduated means associated with said lever for indicating the different rate positions thereof, V-belts connecting said pulleys to a pair of expansible idler V-pulleys, said idler pulleys having integral adjacent members rotatable in fixed planes, means connecting the remote members of the idler pulleys for rotation with the adjacent members but for axial movement relative thereto whereby the pitch diameters of the idler pulleys will be inversely changed automatically by belt tension differentials in accordance with adjustment of said bell crank lever.

5. A mechanism of the character described comprising in combination a pair of expansible V-pulleys, a sleeve rotatably supporting the adjacent members of said pulleys, fixed bearings for supporting the remote members of the pulleys, a power driven spline shaft engaging the members of one pulley, a second spline shaft engaging the members of the other pulley for actuation thereby, means to adjust said sleeve axially to expand one pulley and contract the other comprising a manually actuable bell crank lever, means for positively locking the lever in different rate positions, graduated means associated with said lever for indicating the different rate positions thereof, V-belts connecting said pulleys to a pair of expansible idler V-pulleys, said idler pulleys having integral adjacent members rotatable in fixed planes, means connecting the remote members of the idler pulleys for rotation with the adjacent members but for axial movement relative thereto whereby the pitch diameters of the idler pulleys will be inversely changed automatically by belt tension differentials in accordance with adjustment of said bell crank lever, and additional means for effecting relative bodily adjustment of the expansible V-pulleys and the idler V-pulleys whereby the effective tension of the connecting V-belts as an entirety may be varied.

HAROLD A. BOWERS.